United States Patent

Harz

[15] 3,687,207
[45] Aug. 29, 1972

[54] ROCK DRILL
[72] Inventor: Willi Harz, Friedrichshafen, Germany
[73] Assignee: Hawera Hartmetall-Werkzeugfabrik Gesellschaft mit beschrankter Haftung, Revensburg, Germany
[22] Filed: Dec. 15, 1969
[21] Appl. No.: 885,146

[30]     Foreign Application Priority Data
    Dec. 19, 1968    Germany ............G 68 12 098

[52] U.S. Cl..................................175/410, 175/415
[51] Int. Cl..............................................E21c 13/06
[58] Field of Search......175/410, 411, 394, 395, 420, 175/415, 320

[56]         References Cited
         UNITED STATES PATENTS 2,522,045    9/1950    Knowles....................175/410
2,565,333    9/1951    Weidman et al...........175/410
2,598,459    5/1952    Steffes.......................175/410
2,614,811    10/1952   Melendy....................175/411 X
2,641,446    6/1953    Haglund et al.........175/410 X
2,673,714    3/1954    Hargrave...................175/394
3,117,637    1/1964    Mortensen.................175/394

Primary Examiner—Marvin A. Champion
Assistant Examiner—Richard E. Favreau
Attorney—Walter Becker

[57]            ABSTRACT

A rock drill, especially for rotary blow drilling, with a drill shank which over its entire length has solid cross sections and which at one end is provided with at least one hard metal cutting part inserted into a transverse groove and supported by the drill head, which latter, at least directly behind the cutting edge, has a substantially circular solid cross section.

15 Claims, 3 Drawing Figures

PATENTED AUG 29 1972　　3,687,207

Inventor:
Willi Harz
By Walter Becky

ROCK DRILL

The present invention relates to a rock drill, especially for rotary blow drilling, with a drill shank which has a full cross section over its entire length and one end of which is equipped with a drill head which has at least one hard metal cutting member inserted especially into a transverse groove. A drill of this general type is known in which the mantle surface in the area of the drilling head as well as in the area of the shank has helical grooves starting at the drill tip for conveying away the drilled material. These grooves represent a considerable weakening of the cross section of the drill up to the drill tip so that drills of this type, especially of a smaller diameter of, for instance, around 7 millimeters, not unfrequently break in view of the blow stresses occurring during the rotary blow drilling.

Furthermore, drills have become known which instead of helical grooves have grooves which extend parallel to the axis of the drill section. These grooves, however, are likewise extending up to the tip of the drill so that the cross section is likewise weakened in the area of the drill head which is weakened anyhow by the embedding of the hard metal cutting member and represents the most stressed zone of the drill.

Finally, drills have become known according to which the shank in contrast to the drills of the above mentioned type do not have a full cross section, but are provided in the shank with so-called scavenging bores through which either by means of suction air the drilled material forming at the cutting edge is withdrawn, or is blown out by compressed air. The scavenging bores also represent a considerable weakening of the cross section of the bore shank which is disadvantageous especially with drills of smaller diameter. Particularly disadvantageous in this connection is the fact that the scavenging bore may become clogged up and that for the operation of such drill specific driving units with a pressure and a suction air source are necessary. With these drills, the shank tapers from the drilling tip over a longer or shorter distance toward the chucking end so that the drill can be jammed by the drilling dust in the drilling hole if said drilling dust is not removed in the described manner by means of an air flow.

It is an object of the present invention to provide a rock drill of the above mentioned type so that while being of a considerably simpler structure it will have a greater strength even with relatively small drill diameters.

This object and other objects and advantages of the invention will appear more clearly from the following specification in connection with the accompanying drawing, in which.

Figure 1:
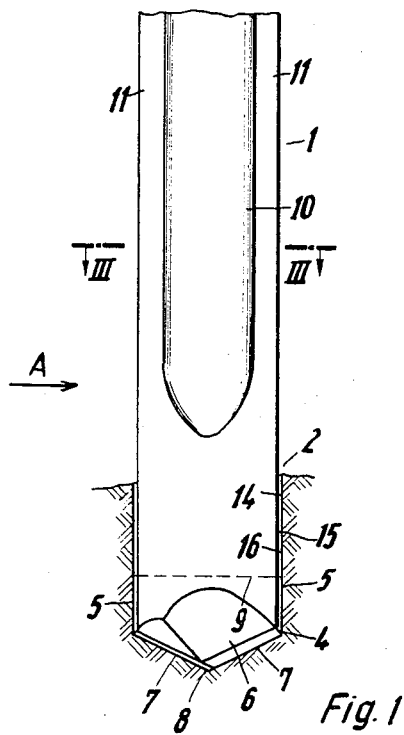
FIG. 1 shows a view of the front portion of a drill according to the invention.

The rock drill according to the present invention which has a drilling head with a hard metal cutting edge inserted in a transverse groove is characterized primarily in that the drilling head at least directly behind the cutting part has a substantially circular full cross section. In this way the drilling head may at best be weakened only by the inserted hard metal cutting part, but is not additionally weakened by any means for withdrawing the drilled material so that a relatively high strength of the rock drill will be obtained within the area of that zone which is subjected to the high stresses. This is particularly the case when the groove bottom of the transverse groove is located behind the front end of the drilling head section which has a circular full cross section.

In order to prevent a clogging up of the drilling hole and a jamming of the drill when it is intended to withdrawn the drill, the drill is, in conformity with the present invention, cylindrical within the area of the circular full cross section whereby in an advantageous manner a very satisfactory guiding of the drill in the drilled hole will be obtained. This will be further improved by the fact that the diameter of the circular full cross section of the drilling head corresponds substantially to the maximum cross sectional extension of the drill shank.

It has proved advantageous to provide the mantle surface of the shank of the drill with at least one, preferably two diametrically oppositely located partial surfaces for the withdrawal of the drilled material, which partial surfaces are offset rearwardly and extend approximately over the entire length of the shank. The withdrawal of the drilled material starts at the rear end of the drilling head and thus in spaced relationship to the drill tip at the rear end of the cutting part. The extension of this partial surface in axial direction of the drill is greater than the intended maximum drilling depth to be accomplished by the drill. Such rearwardly offset partial surface which interrupts in particular that cylindrical mantle surface of the drill shank brings about that drilled particles which got stuck in the annular gap between the shank of the drill and the drilled bore wall can in an advantageous manner be continuously freed. Advantageously, the distance between the front end of the rearwardly offset partial surface and the rear end of the cutting part amounts to approximately from one-half to 1 times the drill diameter.

The rearwardly offset partial surface of the drill shank may form a groove extending rectilinearly or helically. A particularly minor weakening of the drill cross section is obtained when the rearwardly offset partial surface is designed substantially plane and when it extends parallel to the axis of the shank. The rock drill according to the invention can be produced in a very simple manner if the rearwardly offset partial surface is formed by a flattening of the drill shank which otherwise is cylindrical.

In order to avoid notch effects at the ends of the rearwardly offset partial surface, at least the front end, preferably each end of this partial surface, merges by means of a concave rounding with the circumference of the shank while the radius of said rounding may exceed the diameter of the shank.

According to a further development of the invention, the cutting edges of the drilling head which are provided on the preferably plate-shaped cutting member protrudes slightly beyond the mantle surface of the drilling head so that between the circumferential surface of the drilling head and the wall of the drilled bore there forms an annular gap by means of which an advantageous withdrawal of the drilled material can be effected.

A particular advantage of the rock drill according to the present invention is seen in the fact that the drilled material being formed on the tool cutting edge is, in view of very strong axial blows and the displacing effect of the drilling head, pressed through the narrow annular gap between the drilling head and the wall of the drilled bore, the drilled material being subjected to a high acceleration and being expelled in small individual quantities. The rock drill according to the invention is able, in view of its great stability, to withstand very high stresses as they occur during a rotary shock drive by a drill hammer. By means of a rock drill according to the invention, also bores of small diameter can be drilled with sufficient depth for receiving plugs in concrete or other hard rock.

Figure 2:
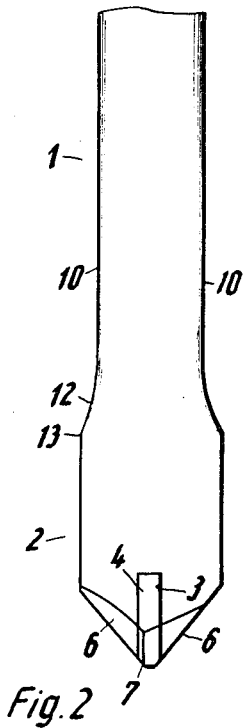
FIG. 2 is a view of the drill of FIG. 1 as seen in the direction of the arrow A.
Figure 3:
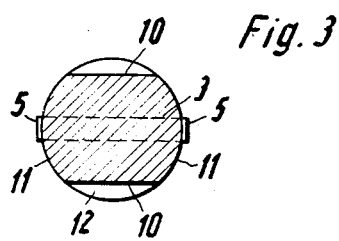
FIG. 3 represents a section taken along the line III—III of FIG. 1.

Referring now to the drawing in detail, FIGS. 1 – 3 illustrate a rock drill according to the invention which has a shank 1 having its front end provided with a drilling head 2. The drilling head 2, which over substantially its entire axial length, is cylindrical has said shank 1 formed as a single piece therewith. The front end face of said drilling head 2 is provided with a diametrically located groove 3 having inserted therein a hard metal cutting plate 4 which may be connected to the drilling head 2 in any convenient manner, for instance, by soldering. Plate 4 has its lateral edges, which extend in an axis parallel manner to the drill, protrude slightly at oppositely located sides of the drilling head 2 to the same extent beyond the bore head 2. The drilling head 2 has its end face provided with flank surfaces 6 ground thereon in such a way that on the cutting plate 4 there are formed two individual cutting edges 7 defining with each other an obtuse angle. The said cutting edges 7 merge with each other approximately at the drill head 8 located approximately within the axis of the drill. The flank surfaces 6 are so located that their extension in axial direction of the drill is less than the depth of the groove 3 in such a way that the bottom surface 9 of groove 3 is located in axial direction of the drill and in spaced relationship thereto behind the surface 6. As a result thereof, the drilling head 2 is cylindrical within the range of the cutting plate 4 and in the section subsequent thereto, while the drill head 2 within the said range has circular solid cross sections which means non-interrupted cross sections.

The drill shank 1 and the drill head 2 consist of a single cylindrical integral part so that also the diameter of the cylindrical drill shank precisely corresponds to that of the drill head 2. The drill shank 1 has two diametrically oppositely located sides provided with plane parallel radially offset partial surfaces 10 forming a flat surfaces so that the drill shank 1 has only partially cylindrical mantle surfaces 11. The two flat areas 10 are located symmetrically with regard to the axial plane of the drill therebetween. The front ends of said flat areas 10, in other words, those ends of the flat portions 10 which are directed toward the tip 18 of the drill merge through concave rounded areas 12 with the drill head 2 while the radius of said rounded areas 12 exceeds the diameter of the drill head 2 or the cylindrical mantle surfaces 8 of the drill shaft 1. The front ends 13 of the rearwardly offset partial surfaces 10, 12 end at a distance from the rear end of the cutting part 4 which is adjacent the bottom of the groove 9. This distance equals approximately the diameter of the drill. Each flattened area 10 is rearwardly offset by about from 0.1 to 0.15 times the largest cross sectional extension of shank 1 over the cylindrical mantle surfaces 11, said largest cross sectional extension being formed by the cylindrical mantle surfaces 11. Thus, the depth of each flattened area 11 corresponds approximately to from 0.1 to 0.15 times the shank diameter.

As will be evident from FIGS. 1 and 2, the drill head 2 within the area between the cutting part 4 and the drill shank 1 comprising the flattened portions 10 is in no way weakened in its cross section, but within the said area has a cylindrical section with a solid cross section and thus with increased strength.

When rotary blow drilling with the rock drill according to the invention, in view of the cutting edges 7 protruding beyond the drill head mantle there is, between the drilled bore wall 14 and the circumference of the drill 15, formed a narrow annular gap 16 through which the drilled material is pressed at great acceleration in view of the displacing effect of the drill head 2 so that the drilled material is, in small individual quantities, pushed out from the area of the flattened portions 10 pertaining to the drill shank 1. If particles of the drilled material get jammed between the drill shank 1 or its mantle surfaces 11 and the drill bore wall 14, these particles will, in view of the flattened portion 10, be freed again immediately so that a highly satisfactory withdrawal of the drilled material will be assured.

It is, of course, to be understood that the present invention is, by no means, limited to the particular showing in the drawing, but also comprises any modifications within the scope of the appended claims.

What I claim is:

1. A rock drill, especially for rotary blow drilling, with a one-piece shank having solid cross sections throughout its twist-free length and having a forward end provided with a drill head and a hard metal cutting element projecting laterally over the shank carried by said drill head having face surface chamfered for formation of cutting flank surfaces, said drill head at least directly adjacent to the cutting flank surfaces and behind said cutting element when viewing said drill from said head toward said shank having substantially circular solid cross sections respectively having diameter only slightly smaller than working diameter of said hard metal cutting element and having length at least approximately one-half as great as diameter thereof, said shank having variable diameter throughout its entire length.

2. A rock drill according to claim 1, in which the diameter of said circular solid cross sections of said drill head corresponds approximately to the largest cross-sectional extension of said shank of said rock drill.

3. A rock drill according to claim 1, in which said shank has an at least partially cylindrical mantle surface with a diameter substantially corresponding to the diameter of said drill head.

4. A rock drill according to claim 1, in which said cutting element is substantially plate-shaped and provided with cutting edges slightly protruding beyond the mantle surface of said drill head.

5. A rock drill according to claim 1, in which said drill head consists of a single integral piece with said shank.

6. A rock drill according to claim 1, in which said drill head is provided with a transverse groove having said cutting element firmly arranged therein.

7. A rock drill according to claim 6, in which the bottom of said transverse groove is located behind the front end of that drill head section which has solid cross sections.

8. A rock drill according to claim 7, in which the drill head is cylindrical within the range of its circular solid cross sections for a length lying between a half and unity in relation to working diameter of the drill.

9. A rock drill, especially for rotary blow drilling, with a shank having solid cross sections throughout its length and having one end provided with a drill head and a hard metal cutting element carried by said drill head, said drill head at least directly behind said cutting element when viewing said drill from said head toward said shank having substantially circular solid cross sections, said shank having an at least partially cylindrical mantle surface with a diameter substantially corresponding to the diameter of said drill head, the mantle surface of said shank having at least one surface set back radially inwardly with regard to said mantle surface and extending over at least the major length of said shank for permitting the escape of drilled material, said set back surface ending at the rear end portion of said drill head.

10. A rock drill according to claim 9, in which said set back mantle surface portion is formed by a flattened area of the cylindrical periphery of the shank of said rock drill.

11. A rock drill according to claim 9, in which the set back mantle surface portion is set back by from 0.1 to 0.15 times the maximum cross-sectional extension of said shank.

12. A rock drill according to claim 9, in which at least the front end of said set back mantle surface portion merges with the cylindrical periphery of the rock drill through a concave rounded portion, the radius of said rounded portion exceeding the diameter of said shank.

13. A rock drill according to claim 9, in which the spacing between the front end portion of the set back mantle surface and the rear end of the cutting element corresponds approximately to from half the diameter to one times the diameter of the drill while said set back mantle surface portion is substantially plane.

14. A rock drill according to claim 13, in which said set back mantle surface portion is parallel to the axis of the shank of the drill.

15. A rock drill, especially for rotary blow drilling, with a shank having solid cross sections throughout its length and having one end provided with a drill head and a hard metal cutting element carried by said drill head, said drill head at least directly behind said cutting element when viewing said drill from said head toward said shank having substantially circular solid cross sections, said shank having an at least partially cylindrical mantle surface with a diameter substantially corresponding to the diameter of said drill head, said shank being provided with at least two diametrically oppositely located set back mantle surface portions.

* * * * *